United States Patent
Bastide et al.

(10) Patent No.: US 9,853,981 B2
(45) Date of Patent: Dec. 26, 2017

(54) HANDLING POTENTIAL SERVICE LOAD INTERRUPTIONS BY PRESENTING ACTION ITEMS FOR SERVICE REQUESTER TO COMPLETE TO INCREASE TIME TO ADDRESS POTENTIAL SERVICE LOAD INTERRUPTION

(71) Applicant: International Business Machines Corporation, Armonk, NY (US)

(72) Inventors: Paul R. Bastide, Boxford, MA (US); Lisa Seacat DeLuca, Baltimore, MD (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 14/684,345

(22) Filed: Apr. 11, 2015

(65) Prior Publication Data
US 2016/0301622 A1 Oct. 13, 2016

(51) Int. Cl.
*G06F 15/173* (2006.01)
*H04L 29/06* (2006.01)
(Continued)

(52) U.S. Cl.
CPC ............ *H04L 63/10* (2013.01); *G06F 9/5077* (2013.01); *H04L 47/762* (2013.01); *H04L 67/10* (2013.01);
(Continued)

(58) Field of Classification Search
CPC ....... H04L 63/10; H04L 47/762; H04L 67/10; H04L 67/16; H04L 67/289; H04L 67/2838; H04L 67/306; G06F 9/5077
(Continued)

(56) References Cited

U.S. PATENT DOCUMENTS

| | | | |
|---|---|---|---|
| 8,095,662 B1 * | 1/2012 | Lappas | G06Q 10/06 709/226 |
| 8,352,608 B1 * | 1/2013 | Keagy | G06F 8/63 709/220 |

(Continued)

OTHER PUBLICATIONS

List of IBM Patents or Patent Applications Treated as Related, Feb. 18, 2016, pp. 1-2.

(Continued)

*Primary Examiner* — El Hadji Sall
*Assistant Examiner* — Sahera Halim
(74) *Attorney, Agent, or Firm* — Robert A. Voigt, Jr.; Winstead, P.C.

(57) ABSTRACT

A method, system and computer program product for handling potential service load interruptions. The utilization of resources, such as servers in a service infrastructure of a SaaS provider, are monitored. If the utilization of a resource exceeds a threshold, then the resource is identified as having an excessive service load leading to a potential service load interruption. When a request is received from a user requesting to access such a resource, one or more action items to be completed by the user are generated and presented to the user. "Action items" refer to any activity that is required by the user to be performed thereby providing the SaaS provider additional time to address the potential service load interruption in an appropriate manner. Additional action item(s) will be presented to the user until the SaaS provider addresses the potential service load interruption, at which point, the request will be serviced.

12 Claims, 4 Drawing Sheets

(51) Int. Cl.
H04L 29/08 (2006.01)
H04L 12/923 (2013.01)
G06F 9/50 (2006.01)

(52) U.S. Cl.
CPC .......... *H04L 67/16* (2013.01); *H04L 67/2819* (2013.01); *H04L 67/2838* (2013.01); *H04L 67/306* (2013.01)

(58) Field of Classification Search
USPC ................................ 709/226, 224, 223, 225
See application file for complete search history.

(56) References Cited

U.S. PATENT DOCUMENTS

| 8,867,734 B2* | 10/2014 | Calman | H04L 12/1813 |
| | | | 379/266.01 |
| 2007/0157300 A1 | 7/2007 | Sivaradjane et al. | |
| 2009/0260068 A1 | 10/2009 | Hariharan et al. | |
| 2015/0365291 A1* | 12/2015 | Burton | H04L 41/0893 |
| | | | 709/226 |

OTHER PUBLICATIONS

"Proof-of-Work System," http://en.wikipedia.org/wiki/Proof-of-work_system, 2014, pp. 1-6.

"Captcha," http://en.wikipedia.org/wiki/CAPTCHA, 2014, pp. 1-10.

"Recaptcha," http://www.google.com/recaptcha/intro, 2014, pp. 1-5.

Chan et al., "Method and System for Injecting Content During a Dynamic Loading Timeslot," IP.com, IP.com No. 000237911, Jul. 21, 2014, pp. 1-2.

* cited by examiner

HANDLING POTENTIAL SERVICE LOAD INTERRUPTIONS BY PRESENTING ACTION ITEMS FOR SERVICE REQUESTER TO COMPLETE TO INCREASE TIME TO ADDRESS POTENTIAL SERVICE LOAD INTERRUPTION

TECHNICAL FIELD

The present invention relates generally to software services, and more particularly to handling potential service load interruptions by presenting action items for the service requester to complete to increase time to address the potential service load interruption.

BACKGROUND

Software-as-a-Service ("SaaS") is a software licensing and delivery model in which software is licensed on a subscription basis and is centrally hosted. SaaS is typically accessed by users using a thin client via a web browser. SaaS has become a common delivery model for many business applications, including office and messaging software, payroll processing software, database management software, development software, virtualization, accounting, collaboration, customer relationship management (CRM), management information systems (MIS), enterprise resource planning (ERP), invoicing, human resource management (HRM), content management (CM) and service desk management. SaaS has been incorporated into the strategy of many leading enterprise software companies. One of the biggest selling points for these companies is the potential to reduce information technology (IT) support costs by outsourcing hardware and software maintenance and support to the SaaS provider.

SaaS providers face the possibility of service interruptions daily due to the nature of personal and business patterns. For example, thousands of individuals may log into a fantasy football application at about the same time as the football game is about to start. In another example, hundreds of thousands of individuals may start to read e-mails from their e-mail application at the start of the work day (e.g., 8:30 am). In a further example, millions of tweets may occur in response to a tweet or during an event (e.g., World Cup). Hence, there may be times when the servers at the service infrastructure of the SaaS provider may be potentially overloaded with servicing requests from users.

When such a situation occurs, there are various means in attempting to address the situation, such as adding more servers, redirecting the requests being handled by a server subject to a potential overload condition to another server, etc. However, the servers may not be added in time to address the potential service interruption thereby causing the SaaS provider to experience service load interruptions. The server subject to being overloaded may not have time to redirect some of the requests it is handling to another server thereby causing the SaaS provider to experience service load interruptions.

If, however, additional time could be provided to the SaaS provider to handle potential service load interruptions, then the SaaS provider may be able to address the problem in an appropriate manner.

BRIEF SUMMARY

In one embodiment of the present invention, a method for handling potential service load interruptions comprises monitoring utilization of a resource in a service infrastructure of a provider. The method further comprises identifying the resource as having an excessive service load thereby causing a potential service load interruption in response to the resource utilization exceeding a threshold. The method additionally comprises receiving a request from a user to access the resource. Furthermore, the method comprises generating, by a processor, one or more action items to be completed by the user in response to receiving the request from the user to access the resource. Additionally, the method comprises presenting the one or more generated action items to the user to be completed by the user to provide the provider of the service infrastructure additional time to address the potential service load interruption. In addition, the method comprises enabling the request to be serviced in response to the provider addressing the potential service load interruption.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for handling potential service load interruptions. In one embodiment of the present invention, the utilization of resources, such as servers in a service infrastructure of a SaaS provider, are monitored. If the utilization of a resource (e.g., processing cycles over a period of time) exceeds a threshold, then the resource is identified as having an excessive service load leading to a potential service load interruption. When a request is received from a user of a client device requesting to access such a resource, action items to be completed by the user are generated. "Action items," as used herein, refer to any activity that is required by the user of a client device to be performed thereby providing the SaaS provider additional time to address the potential service load interruption in an appropriate manner. Examples of action items include profile updates, such as updating the user's name, phone number, e-mail address, work title, etc. One or more of these action items are presented to the user to be completed by the user. Upon the user completing the presented action item(s), the user will be presented with additional action item(s) if the SaaS provider needs additional time to address the potential service load interruption. Upon the SaaS provider addressing the potential service load interruption, the user's request is able to be serviced even if the user has not yet completed the action item(s) presented to the user. In this manner, the SaaS provider is provided with additional time to address the potential service load interruption in an appropriate manner.

While the following discusses the present invention in connection with handling potential service load interruptions by a SaaS provider, the principles of the present invention may be applied to any provider of software services subject to service load interruptions. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
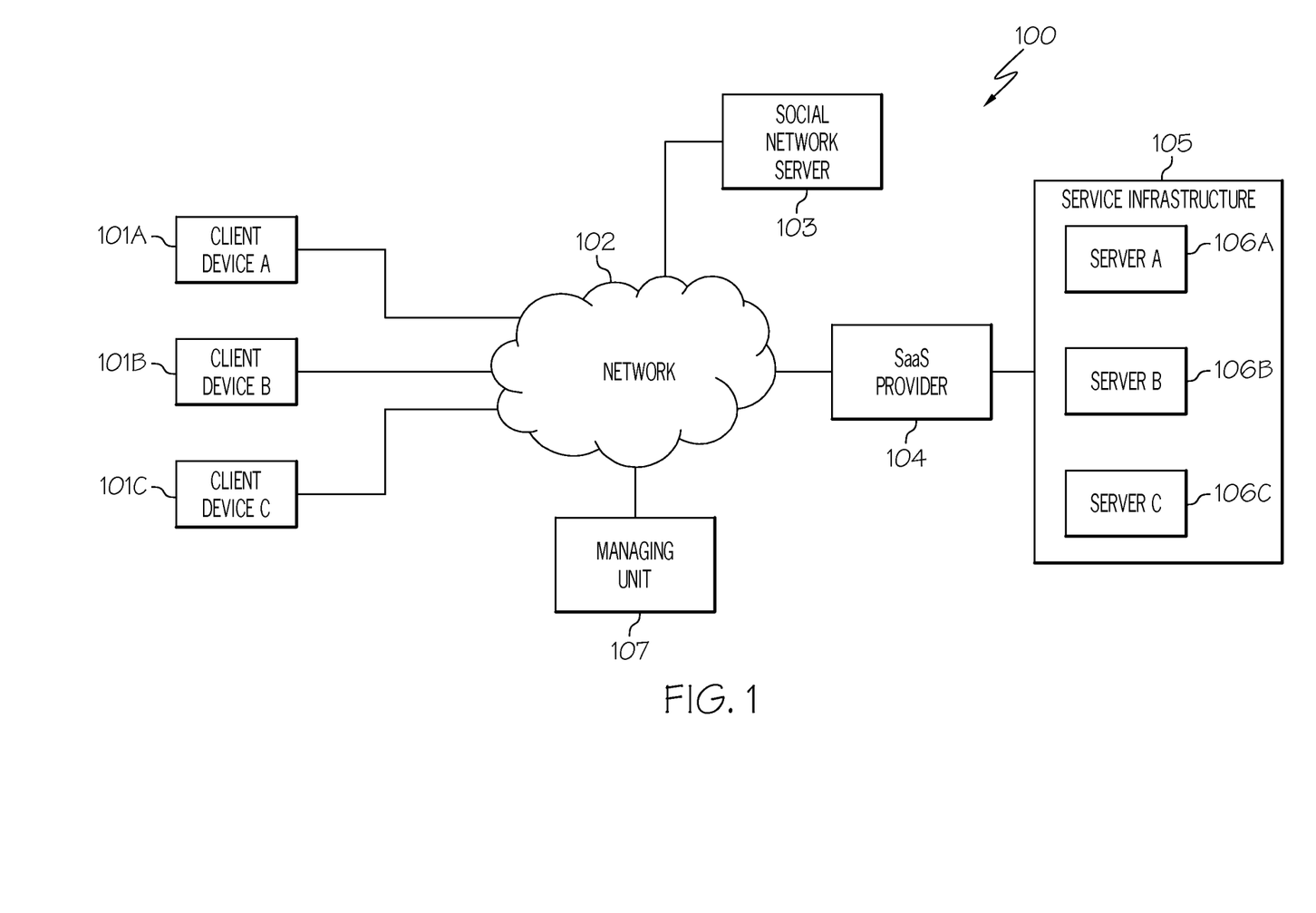
FIG. 1 illustrates a network system configured in accordance with an embodiment of the present invention.

Referring now to the Figures in detail, FIG. 1 illustrates a network system 100 configured in accordance with an embodiment of the present invention. Referring to FIG. 1, network system 100 includes a community of users using client devices 101A-101C (identified as "Client Device A," "Client Device B," and "Client Device C," respectively, in FIG. 1) to be involved in network system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a network, such as a social network, by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include any one or more of the following: text (e.g., messages, comments, sub-comments and replies), audio, video images, etc. Social network server 103 is connected to network 102 by wire or wirelessly.

While FIG. 1 illustrates a single social network server 103, it is noted for clarity that multiple servers may be used to implement the social networking and/or microblogging service.

System 100 further includes a Software-as-a-Service ("SaaS") provider 104 configured to license software on a subscription basis to the users of client devices 101. In connection with providing such a service, SaaS provider 104 utilizes a service infrastructure 105 of servers 106A-106C (identified as "Server A," "Server B," and "Server C," respectively, in FIG. 1). Servers 106A-106C may collectively or individually be referred to as servers 106 or server 106. While FIG. 1 illustrates three servers 106, SaaS provider 104 may include any number of servers 106 in its service infrastructure 105 to handle requests from client devices 101.

System 100 additionally includes a unit, referred to herein as the "managing unit" 107, configured to handle potential service load interruptions by presenting action items for the user of client device 101 to complete to provide SaaS provider 104 additional time to address the potential service load interruption as discussed in further detail below. A description of the hardware configuration of monitoring unit 107 is provided below in connection with FIG. 2.

System 100 is not to be limited in scope to any one particular network architecture. System 100 may include any number of clients 101, networks 102, social network servers 103, SaaS providers 104 and managing units 107. Furthermore, in one embodiment, managing unit 107 may be part of SaaS provider 104.

Figure 2:
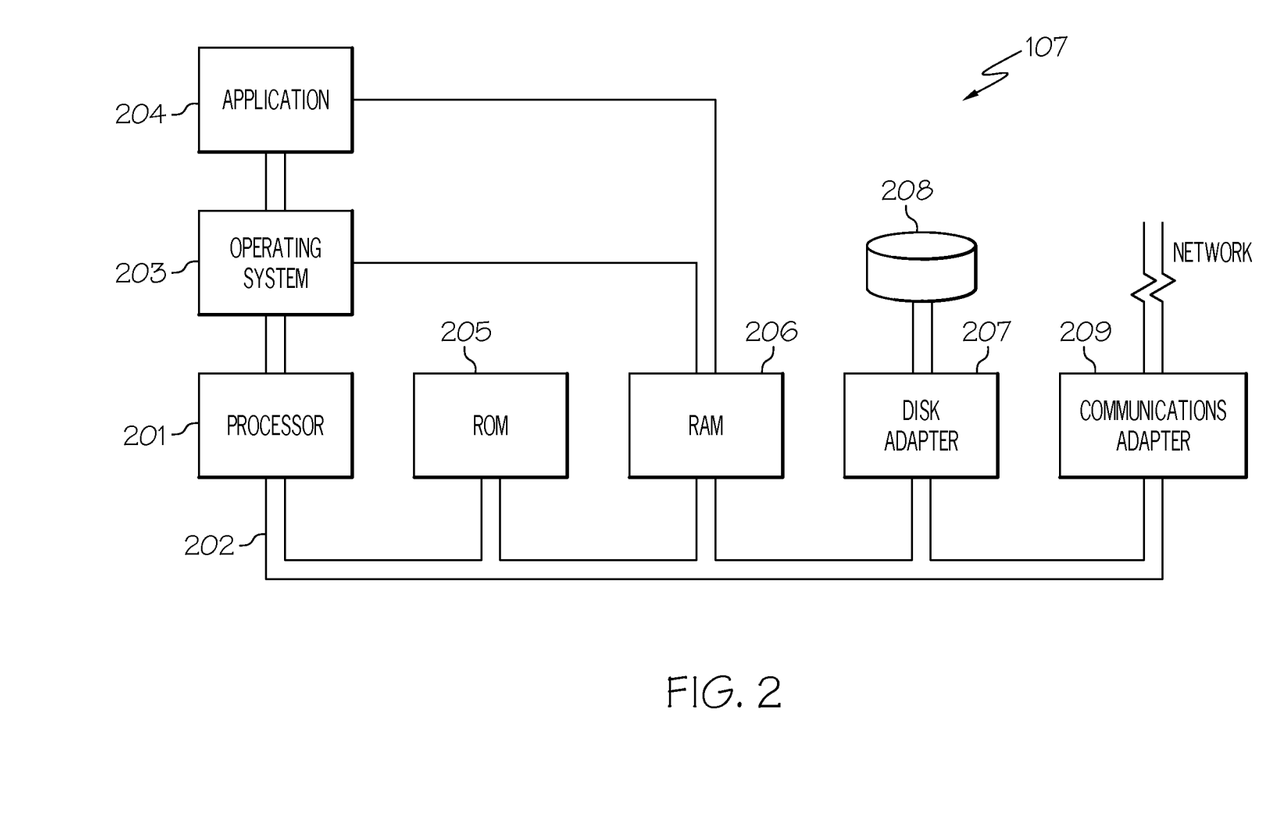
FIG. 2 illustrates a hardware configuration of a managing unit in accordance with an embodiment of the present invention.

Referring now to FIG. 2, FIG. 2 illustrates a hardware configuration of managing unit 107 (FIG. 1) which is representative of a hardware environment for practicing the present invention. Referring to FIG. 2, managing unit 107 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for handling potential service load interruptions by presenting action items for the user of client device 101 (FIG. 1) to complete to provide SaaS provider 104 (FIG. 1) additional time to address the potential service load interruption in an appropriate manner as discussed further below in association with FIGS. 3-4.

Referring again to FIG. 2, read-only memory ("ROM") 205 is coupled to system bus 202 and includes a basic input/output system ("BIOS") that controls certain basic functions of managing unit 107. Random access memory ("RAM") 206 and disk adapter 207 are also coupled to system bus 202. It should be noted that software components including operating system 203 and application 204 may be loaded into RAM 206, which may be managing unit's 107 main memory for execution. Disk adapter 207 may be an integrated drive electronics ("IDE") adapter that communicates with a disk unit 208, e.g., disk drive. It is noted that the program for handling potential service load interruptions by presenting action items for the user of client device 101 to complete to provide SaaS provider 104 additional time to address the potential service load interruption in an appropriate manner, as discussed further below in association with FIGS. 3-4, may reside in disk unit 208 or in application 204.

Managing unit 107 may further include a communications adapter 209 coupled to bus 202. Communications adapter 209 interconnects bus 202 with an outside network (e.g., network 102 of FIG. 1) thereby allowing managing unit 107 to communicate with client devices 101, social network server 103 and SaaS provider 104.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, SaaS providers face the possibility of service interruptions daily due to the nature of personal and business patterns. For example, thousands of individuals may log into a fantasy football application at about the same time as the football game is about to start. In another example, hundreds of thousands of individuals may start to read e-mails from their e-mail application at the start of the work day (e.g., 8:30 am). In a further example, millions of tweets may occur in response to a tweet or during an event (e.g., World Cup). Hence, there may be times when the servers at the service infrastructure of the SaaS provider may be potentially overloaded with servicing requests from users. When such a situation occurs, there are various means in attempting to address the situation, such as adding more servers, redirecting the requests being handled by a server subject to a potential overload condition to another server, etc. However, the servers may not be added in time to address the potential service interruption thereby causing the SaaS provider to experience service load interruptions. The server subject to being overloaded may not have time to redirect some of the requests it is handling to another server thereby causing the SaaS provider to experience service load interruptions. If, however, additional time could be provided to the SaaS provider to handle potential service load interruptions, then the SaaS provider may be able to address the problem in an appropriate manner.

Figure 3:
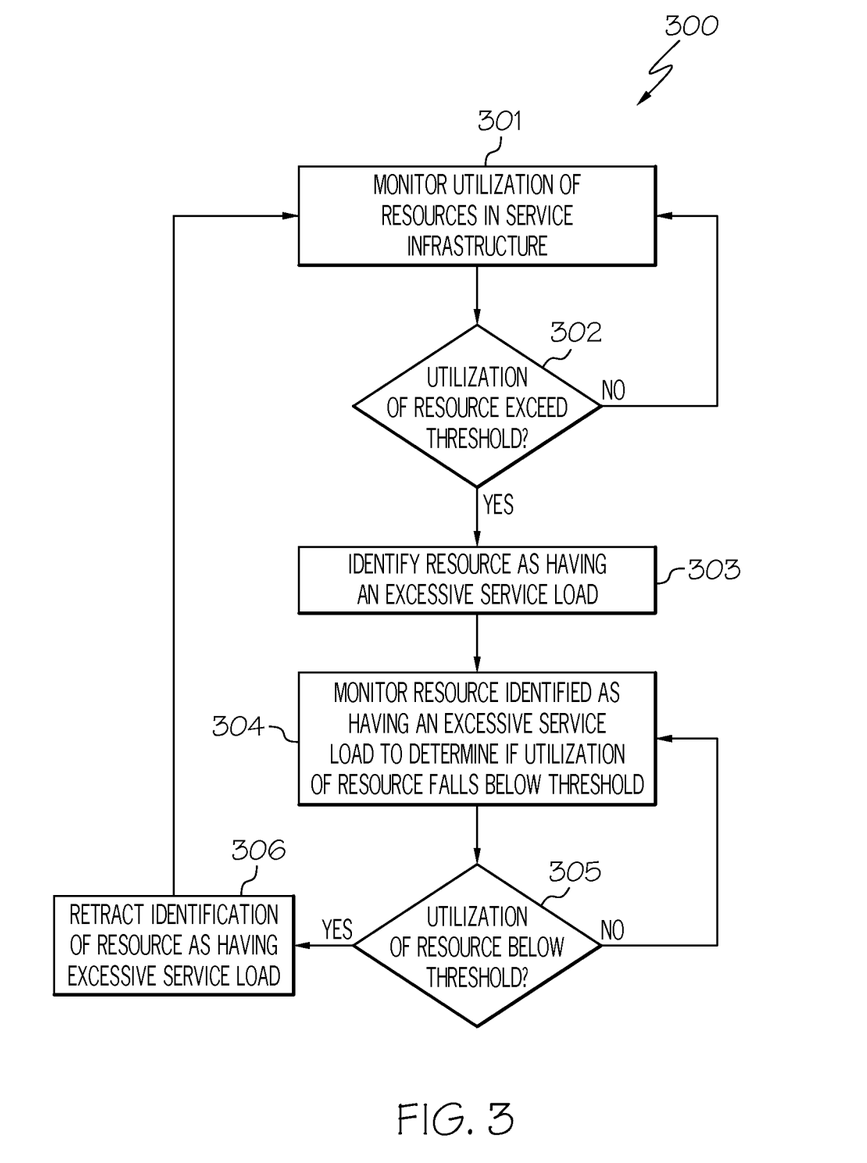
FIG. 3 is a flowchart of a method for detecting a resource having an excessive service load in accordance with an embodiment of the present invention.
Figure 4:
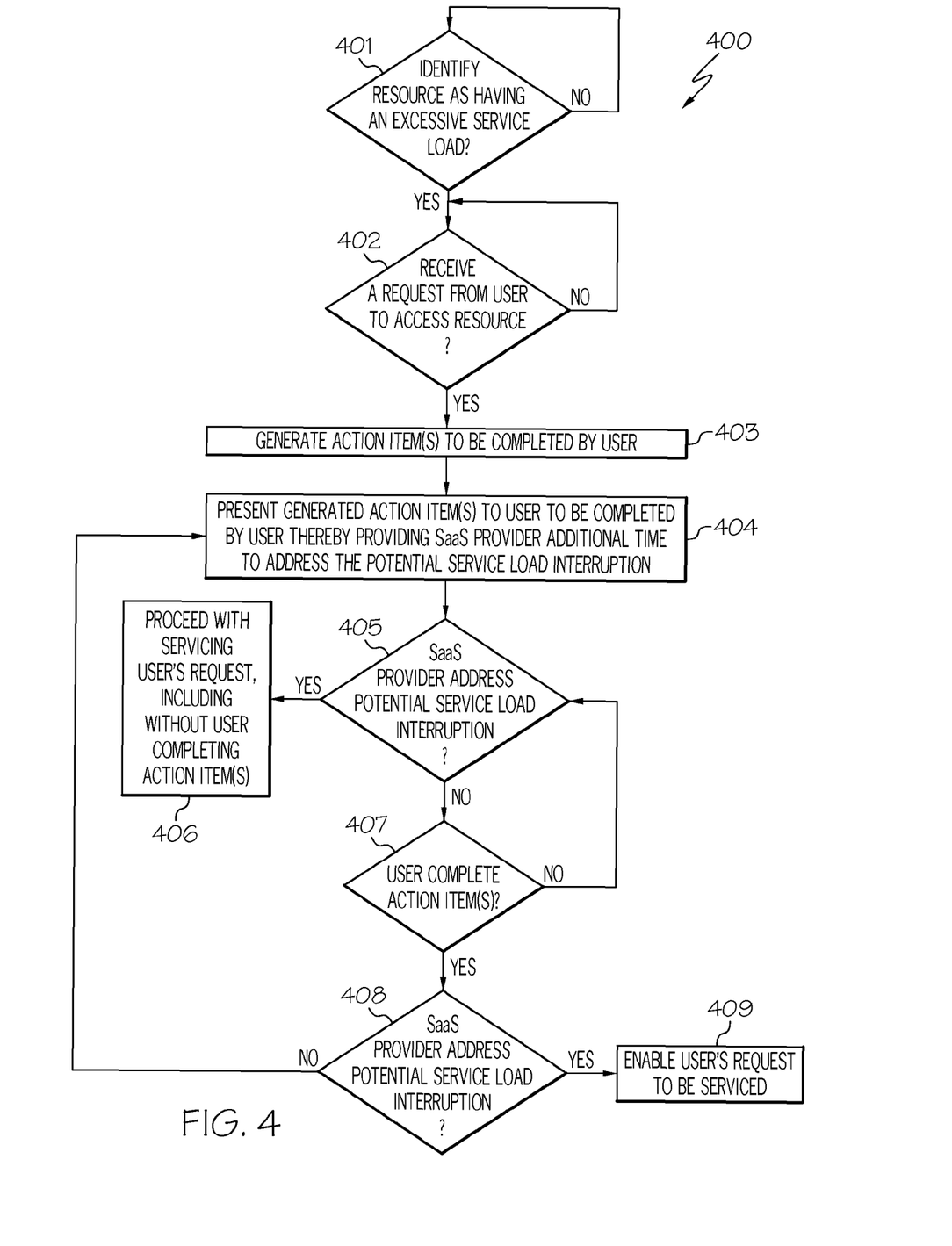
FIG. 4 is a flowchart of a method for handling potential service load interruptions by presenting action items for the user to complete to provide the SaaS provider additional time to address the potential service load interruption in an appropriate manner in accordance with an embodiment of the present invention.

The principles of the present invention provide a means for handling potential service load interruptions by presenting action items for the user of client device 101 (FIG. 1) to complete to provide SaaS provider 104 (FIG. 1) additional time to address the potential service load interruption in an appropriate manner as discussed below in association with FIGS. 3-4. FIG. 3 is a flowchart of a method for detecting a resource, such as server 106, having an excessive service load. FIG. 4 is a flowchart of a method for handling potential service load interruptions by presenting action items for the user of client device 101 to complete to provide SaaS provider 104 additional time to address the potential service load interruption in an appropriate manner.

As stated above, FIG. 3 is a flowchart of a method 300 for detecting a resource, such as server 106, having an excessive service load in accordance with an embodiment of the present invention.

Referring to FIG. 3, in conjunction with FIGS. 1-2, in step 301, managing unit 107 monitors the utilization of the resources in a service infrastructure, such as servers 106 in the service infrastructure 105 of SaaS provider 104. Monitoring the utilization of a resource, as used herein, refers to tracking the utilization of a performance metric (e.g., processing cycles, number of requests to be serviced over a period of time, memory usage, bandwidth usage, thread exhaustion, database lock contention) against the capacity of the resource in connection with the performance metric (e.g., maximum number of processing cycles, maximum number of requests that can be serviced over a period of time). While the following discusses servers 106 of service infrastructure 105 of SaaS provider 104 as corresponding to the resources whose utilization are being monitored, the principles of the present invention are to apply to other types of resources that are utilized by SaaS provider 104 in providing software to be licensed by the users of client devices 101.

In step 302, a determination is made by managing unit 107 as to whether the utilization of a resource (e.g., server 106a) exceeds a threshold. For example, a determination may be made by managing unit 107 as to whether the processing unit of server 106A reached 75% utilization. In one embodiment, the threshold selected is arbitrary and can be directed to either low or high utilization (e.g., 70% utilization versus 90% utilization).

If the utilization of a resource (e.g., server 106a) does not exceed a threshold, then managing unit 107 continues to monitor the utilization of the resources in the service infrastructure (e.g., service infrastructure 105) in step 301.

If, however, the utilization of a resource (e.g., server 106A) exceeds a threshold, then, in step 303, managing unit 107 identifies the resource (e.g., server 106A) as having an excessive service load leading to a potential service load interruption. An "excessive service load," as used herein, refers to the situation where a resource (e.g., server 106A) is experiencing an excessive amount of utilization yet is still able to service users' requests at such a utilization for the time being. Managing unit 107 attempts to identify such situations to identify potential service load interruptions thereby allowing SaaS provider 104 time to address such potential service load interruptions before they actually become an interruption to SaaS provider 104 providing software services.

In step 304, managing unit 107 monitors the resource (e.g., server 106A) identified as having an excessive service load to determine if its utilization falls below the threshold (e.g., CPU utilization is now below 75% utilization).

In step 305, a determination is made by managing unit 107 as to whether the utilization of the resource (e.g., server 106A) identified as having an excessive service load falls below the threshold.

If the utilization of the resource (e.g., server 106A) identified as having an excessive service load does not fall below the threshold, then managing unit 107 continues to monitor the resource identified as having an excessive service load to determine if its utilization falls below the threshold in step 304.

If, however, the utilization of the resource (e.g., sever 106A) identified as having an excessive service load falls below the threshold, then, in step 306, managing unit 107 retracts the identification of the resource as having an excessive service load.

Upon retracting the identification of the resource as having an excessive service load, managing unit 107 continues to monitor this resource as well as the other resources in the service infrastructure to determine if its utilization exceeds a threshold in steps 301 and 302.

Upon identifying a resource as having an excessive service load (step 303 of FIG. 3), managing unit 107 handles the potential service load interruption by presenting action items for the user of client device 101 to complete to provide SaaS provider 104 additional time to address the potential service load interruption in an appropriate manner as discussed below in connection with FIG. 4.

FIG. 4 is a flowchart of a method 400 for handling potential service load interruptions by presenting action items for the user of client device 101 (FIG. 1) to complete to provide SaaS provider 104 (FIG. 1) additional time to address the potential service load interruption in an appropriate manner in accordance with an embodiment of the present invention.

Referring to FIG. 4, in conjunction with FIGS. 1-3, in step 401, a determination is made by managing unit 107 as to whether a resource (e.g., server 106A) has been identified as having an excessive service load.

If a resource has not been identified as having an excessive service load, then managing unit 107 continues to determine whether a resource has been identified as having an excessive service load in step 401.

If, however, a resource has been identified as having an excessive service load, then, in step 402, a determination is made by managing unit 107 as to whether it received a request from a user of client device 101 to access the resource identified as having an excessive service load. In one embodiment, managing unit 107 is configured to intercept requests to the resources (e.g., servers 106) of SaaS provider 104, including those resources that are identified as having an excessive service load. In this manner, as discussed below, managing unit 107 can provide SaaS provider 104 additional time in addressing the potential service load interruption.

If managing unit 107 did not receive a request from a user of client device 101 to access the resource identified as having an excessive service load, then managing unit 107 continues to determine whether it received a request from a user of client device 101 to access the resource identified as having an excessive service load in step 402.

If, however, managing unit 107 received a request from a user of client device 101 to access the resource identified as having an excessive service load, then, in step 403, managing unit 107 generates one or more action items to be completed by the user of client device 101 to provide SaaS provider 104 additional time to address the potential service load interruption in an appropriate manner.

"Action items," as used herein, refer to any activity that is required by the user of client device 101 to be performed thereby providing SaaS provider 104 additional time to address the potential service load interruption in an appropriate manner. Examples of action items include profile updates, such as updating the user's name, phone number, e-mail address, work title, etc. In one embodiment, managing unit 107 may only generate and/or provide action items concerning profile items that have not been updated over a last period of time (e.g., 30 days) or have not been updated at all. Another example of an action item includes what is referred to as "crowdsourcing profile information," where managing unit 107 obtains publicly available information from social media sources (e.g., Facebook®, LinkedIn®) of the user and the user's friends and generates an action item to update a social media profile, such as a profile on the user's Facebook® profile page. In one embodiment, managing unit 107 may determine the user's friends from the user's social media profile page which contains a listing of the user's friends or connections.

Additional examples of action items include a countdown, a puzzle and a Completely Automated Public Turing test to tell Computers and Humans Apart ("CAPT", such as when no work is required for the user to be performed.

In step 404, managing unit 107 presents the generated action item(s) to the user of client device 101 to be completed by the user thereby providing SaaS provider 104 additional time in addressing the potential service load interruption. In one embodiment, the action items are presented to the user via a user interface of client device 101. In one embodiment, the action items are presented to the user via a dialog box in the user interface of client device 101. In one embodiment, the particular action items that are presented to the user are based on the type of computing device (e.g., smartphone versus desktop computing system) of client device 101. For example, a mobile device user might find it more difficult to fill out a large form due to the small size of the display screen of a mobile device in comparison to a desktop computing system. As a result, a more simplified version of the form may be sent to a mobile device user in comparison to the version of the form sent to a desktop computer user. In another embodiment, the particular action items that are presented to the user are based on the perceived complexity and length of answer which may be determined based on prior users answering similar questions. For example, managing unit 107 may track the duration of time in the user's answering questions thereby providing an estimation for how long a user would take to answer a similar question.

In one embodiment, the action items presented to the user of client device 101 are based on being directly related to the activities utilized by the user of client device 101. For example, if the user utilizes activities which require a profile, then the action items may be limited to updating such a profile.

In one embodiment, managing unit 107 may track the user's previous responses to the action items presented to the user. Based on the user's prior responses, the user may receive designated action items. For example, if the user had previously dismissed particular action items, such as puzzles, then puzzles would not be presented to the user as an action item in the future to reduce annoyances.

In step 405, a determination is made by managing unit 107 as to whether SaaS provider 104 has addressed the potential service load interruption, such as by scaling out by adding servers 106 to service infrastructure 105.

If SaaS provider 104 has addressed the potential service load interruption, then, in step 406, managing unit 107 enables the user's request to be serviced, including without having the user complete the action item(s). That is, the user's request may be serviced prior to the user completing the action item(s) if SaaS provider 104 has addressed the potential service load interruption. Servicing the request may involve having the requested resource (e.g., server 106A) handle the request if the resource is no longer experiencing a potential service load interruption (e.g., utilization of the resource falls below the threshold). The requested resource (e.g., server 106A) may no longer be experiencing a potential service load interruption if SaaS provider 104 was able to address the problem during the additional time provided to SaaS provider 104 by having the user complete action item(s). Alternatively, the user's request may be serviced by a different resource (e.g., additional server 106 added to service infrastructure 105 to handle the increase load, a replacement server 106 added to service infrastructure 105 to replace the server 106 experiencing a potential service load interruption).

If, however, SaaS provider 104 has not addressed the potential service load interruption, then, in step 407, a determination is made by managing unit 107 as to whether the user completed the action item(s) (the action item(s) presented to the user in step 404).

If the user has not completed the action item(s), then a determination is made by managing unit 107 as to whether SaaS provider 104 has addressed the potential service load interruption in step 405.

If, however, the user has completed the action item(s), then, in step 408, a determination is made by managing unit 107 as to whether SaaS provider 104 has addressed the potential service load interruption.

If SaaS provider 104 has addressed the potential service load interruption, then, in step 409, managing unit 107 enables the user's request to be serviced as discussed above in connection with step 406.

If, however, SaaS provider 104 has not addressed the potential service load interruption, then, in step 404, managing unit 107 presents one or more additional generated action items to the user of client device 101 to be completed by the user to provide SaaS provider 104 additional time in addressing the potential service load interruption. In this manner, SaaS provider 104 is provided with the time it needs to address the potential service load interruption in an appropriate manner prior to having a significant interruption of its software services.

In one embodiment, managing unit 107 may implement the principles of the present invention discussed above to handle potential service load interruptions for designated individuals, organizations or groups.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for handling potential service load interruptions, the computer program product comprising a computer readable storage medium having program code embodied therewith, the program code comprising the programming instructions for:
   monitoring utilization of a resource in a service infrastructure of a Software-as-a-Service provider, wherein said monitoring utilization of said resource in said service infrastructure of said Software-as-a-Service provider comprises tracking a utilization of a performance metric against a capacity of said resource in connection with said performance metric, wherein said performance metric comprises processing cycles, number of requests to be serviced over a period of time, memory usage, bandwidth usage, thread exhaustion and database lock contention;
   identifying said resource as having an excessive service load thereby causing a potential service load interruption in response to said resource utilization exceeding a threshold;
   receiving a request from a user to access said resource in said service infrastructure of said Software-as-a-Service provider;
   generating one or more action items to be completed by said user in response to receiving said request from said user to access said resource in said service infrastructure of said Software-as-a-Service provider;
   presenting said one or more generated action items to said user to be completed by said user to provide said Software-as-a-Service provider of said service infrastructure additional time to address said potential service load interruption; and
   enabling said request to be serviced in response to said Software-as-a-Service provider addressing said potential service load interruption.

2. The computer program product as recited in claim 1, wherein the program code further comprises the programming instructions for:
   proceeding with servicing said request prior to said user completing said one or more generated action items in response to said Software-as-a-Service provider addressing said potential service load interruption prior to said user completing said one or more generated action items.

3. The computer program product as recited in claim 1, wherein the program code further comprises the programming instructions for:
   presenting one or more additional generated action items to said user to be completed by said user after said user has completed said one or more generated action items in response to said Software-as-a-Service provider needing additional time to address said potential service load interruption.

4. The computer program product as recited in claim 1, wherein said action items comprise two or more of the following: profile updates, metadata updates, a countdown, a puzzle and a Completely Automated Public Turing test to tell Computers and Humans Apart.

5. The computer program product as recited in claim 1, wherein said action items are prioritized based on perceived complexity and length of time to answer.

6. The computer program product as recited in claim 1, wherein which of said one or more generated action items are presented to said user is based on a computing device utilized by said user.

7. A system, comprising:
   a memory unit for storing a computer program for handling potential service load interruptions; and
   a processor coupled to the memory unit, wherein the processor is configured to execute the program instructions of the computer program comprising:
      monitoring utilization of a resource in a service infrastructure of a Software-as-a-Service provider, wherein said monitoring utilization of said resource in said service infrastructure of said Software-as-a-Service provider comprises tracking a utilization of a performance metric against a capacity of said resource in connection with said performance metric, wherein said performance metric comprises processing cycles, number of requests to be serviced over a period of time, memory usage, bandwidth usage, thread exhaustion and database lock contention;
      identifying said resource as having an excessive service load thereby causing a potential service load interruption in response to said resource utilization exceeding a threshold;
      receiving a request from a user to access said resource in said service infrastructure of said Software-as-a-Service provider;
      generating one or more action items to be completed by said user in response to receiving said request from said user to access said resource in said service infrastructure of said Software-as-a-Service provider;
      presenting said one or more generated action items to said user to be completed by said user to provide said Software-as-a-Service provider of said service infrastructure additional time to address said potential service load interruption; and
      enabling said request to be serviced in response to said Software-as-a-Service provider addressing said potential service load interruption.

8. The system as recited in claim 7, wherein the program instructions of the computer program further comprises:
   proceeding with servicing said request prior to said user completing said one or more generated action items in response to said Software-as-a-Service provider addressing said potential service load interruption prior to said user completing said one or more generated action items.

9. The system as recited in claim 7, wherein the program instructions of the computer program further comprises:
   presenting one or more additional generated action items to said user to be completed by said user after said user has completed said one or more generated action items in response to said Software-as-a-Service provider needing additional time to address said potential service load interruption.

10. The system as recited in claim 7, wherein said action items comprise two or more of the following: profile updates, metadata updates, a countdown, a puzzle and a Completely Automated Public Turing test to tell Computers and Humans Apart.

11. The system as recited in claim 7, wherein said action items are prioritized based on perceived complexity and length of time to answer.

12. The system as recited in claim 7, wherein which of said one or more generated action items are presented to said user is based on a computing device utilized by said user.

\* \* \* \* \*